US 9,865,241 B2

(12) United States Patent
Colafrancesco et al.

(10) Patent No.: US 9,865,241 B2
(45) Date of Patent: Jan. 9, 2018

(54) METHOD FOR FOLLOWING A MUSICAL SCORE AND ASSOCIATED MODELING METHOD

(71) Applicant: MAKEMUSIC, Paris (FR)

(72) Inventors: Julien Colafrancesco, Montreuil (FR); Grégory Dell'Era, Poissy (FR)

(73) Assignee: MAKEMUSIC, Paris (FR)

( * ) Notice: Subject to any disclaimer, the term of this patent is extended or adjusted under 35 U.S.C. 154(b) by 0 days.

(21) Appl. No.: 15/317,404

(22) PCT Filed: Jun. 8, 2015

(86) PCT No.: PCT/EP2015/062735
§ 371 (c)(1),
(2) Date: Dec. 8, 2016

(87) PCT Pub. No.: WO2015/189157
PCT Pub. Date: Dec. 17, 2015

(65) Prior Publication Data
US 2017/0110102 A1    Apr. 20, 2017

(30) Foreign Application Priority Data
Jun. 10, 2014  (FR) .................... 14 55248

(51) Int. Cl.
*A63H 5/00* (2006.01)
*G04B 13/00* (2006.01)
(Continued)

(52) U.S. Cl.
CPC ........... *G10H 1/361* (2013.01); *G09B 15/023* (2013.01); *G10G 1/00* (2013.01);
(Continued)

(58) Field of Classification Search
CPC ............ G10H 1/361; G10H 2210/066; G10H 2210/076; G10H 2210/091;
(Continued)

(56) References Cited

U.S. PATENT DOCUMENTS 6,084,168 A    7/2000  Sitrick
2011/0036231 A1  2/2011  Nakadai et al.

FOREIGN PATENT DOCUMENTS

JP    2007 241181 A    9/2007

OTHER PUBLICATIONS

Kurth et al., "SyncPlayer—An advanced system for multimodal music access," Jan. 1, 2005, http://audiolabs-erlangen.com/content/05-fau/professor/00-mueller/03-publications/2005 Kurth_MuDaFrRiCl_SyncPlayer_ISMIR.pdf.
(Continued)

*Primary Examiner* — Jeffrey Donels
(74) *Attorney, Agent, or Firm* — Im IP Law; C. Andrew Im

(57) ABSTRACT

A method for following a musical score in real time. At least one sound emitted by a performer is recorded. At least one chromatic vector is estimated. The chromatic vector is compared with theoretical chromatic vectors of the musical score. A transition between the chromatic vector and a previous chromatic vector with theoretical transitions of the musical score is compared. A work position of the performer depending on a previous work position is estimated from the comparison of the chromatic vector and the comparison of the transition. The recording is carried out for a suitable period depending on the ratio between a period of the transition and a reference period.

8 Claims, 2 Drawing Sheets

(51) Int. Cl.
  *G10H 7/00* (2006.01)
  *G10H 1/36* (2006.01)
  *G10G 1/00* (2006.01)
  *G09B 15/02* (2006.01)

(52) U.S. Cl.
  CPC . *G10H 2210/066* (2013.01); *G10H 2210/076* (2013.01); *G10H 2210/091* (2013.01); *G10H 2210/391* (2013.01); *G10H 2220/015* (2013.01); *G10H 2250/021* (2013.01); *G10H 2250/161* (2013.01)

(58) Field of Classification Search
  CPC ....... G10H 2210/391; G10H 2220/015; G10H 2250/021; G10H 2250/161; G09B 15/023; G10G 1/00
  USPC .......................................................... 84/609
  See application file for complete search history.

(56) References Cited

OTHER PUBLICATIONS

Soulez et al., "Improving polyphonic and poly-instrumental music to score alignment," International Conference on Music Information Retrieval (ISMIR 2003), Jan. 1, 2003, pp. 2-7, Baltimore, USA.
Jeda et al., "HMM-based approach for automatic chord detection using refined acoustic features," Acoustics Speech and Signal Processing (ICASSP), 2010 IEEE International Conference, Mar. 14, 2010, pp. 5518-5521, IEEE, Piscataway, NJ, USA.

METHOD FOR FOLLOWING A MUSICAL SCORE AND ASSOCIATED MODELING METHOD

RELATED APPLICATIONS

This application is a §371 application from PCT/EP2015/062735 filed Jun. 8, 2015, which claims priority from French Patent Application No. 14 55248 filed Jun. 10, 2014, each of which is incorporated herein by reference in its entirety.

FIELD OF THE INVENTION

The present invention relates to a method for following a musical score as well as to the associated modeling method. The invention pertains to the field of the reading of digital musical scores.

The invention finds a particularly advantageous application in respect of coaching, the practice of a musical instrument, or directed listening to an interpretation.

BACKGROUND OF THE INVENTION

Software packages exist for following a digital musical score for which the active zone (note, bar, stave, . . . ) is deduced from the tempi of said musical score, or from an a priori tempo provided manually by the performer. These software packages conventionally comprise an element for marking said musical score, for example an overlining or a pointlike indicator. After a time delay indicating the start of reading, the marking element is displaced at a speed corresponding to the tempo of said musical score. The musician can therefore play the musical score in time with the tempo of the score while viewing the active zone (note, bar, stave, . . . ) on which he ought theoretically to be situated having regard to the tempo of the score.

These software packages, whose temporality of reading is defined a priori, do not take into account the actual tempo of the musician when the latter is playing. The musician must "follow the cursor of the score" but cannot define with their own play the position of the cursor on the score. Thus, the musician cannot reduce the speed of scrolling of a part of the score that they have difficulty in interpreting. Likewise, the musician cannot reprise a part of the score that they wish to perfect while being followed by the existing software packages.

OBJECT AND SUMMARY OF THE INVENTION

The present invention is aimed at remedying the drawbacks of the prior art by proposing a method for following a musical score whilst listening to the performances provided by a performer and which is suitable for varying the scrolling speed or position as a function of the performer's interpretation.

For this purpose, according to a first aspect, the invention relates to a method for following a musical score comprising the following steps: display of a marking element on said musical score, and displacement of said marking element, the method also comprising the following steps performed in real time: recording of at least one sound emitted by a performer in the form of a data frame of a duration, estimation of at least one chromatic vector on the basis of a content of said data frame, comparison of said chromatic vector with theoretical chromatic vectors of said musical score, comparison of a transition between said chromatic vector and a previous chromatic vector with theoretical transitions of said musical score, and estimation of a practice position of the performer as a function of a previous practice position, of the comparison of said chromatic vector and of the comparison of said transition, the steps of display and of displacement of said marking element being carried out as a function of said practice position of the performer, and the recording step being carried out over a duration adapted as a function of the ratio between a duration of said transition and a reference duration.

The invention thus makes it possible to recognize the notes or chords provided by the performer and to associate this recognition with the chords of said score. This association allows the method of following to adapt in real time to the interpretation.

For example, the durations relating to the notes or chords are provided as a function of the original tempo of said musical score but the performer does not necessarily conform thereto. The performer may have a desire to speed up or to slow down certain parts. The invention makes it possible to enhance the following of the performer's own specific tempo. Modeling the tempo also makes it possible to obtain an estimation of the performer's current tempo, which may turn out to be very useful for advanced synchronization applications.

According to another example, there exists a strong assumption according to which the performer plays all the notes or chords, in order, from the first to the last. In actual fact, the performer rarely has this discipline; on the contrary, they may wish to train themselves and move to and fro within the piece that they are practicing, stop and then resume somewhere else. In order to address this presumption, the method of the invention can perform "jumps" within the score, breaking the continuity of the score. Thus, discontinuities of play are permitted within the model and, when such a discontinuity arises, the algorithm takes only a restricted time to converge to the new position.

The method implemented applies to a score in the global sense comprising a formalization of chords having a temporality, not solely graphical. For example, the method could indicate a position in a score materialized in the form of a MIDI file (MIDI standing for "Musical Instrument Digital Interface").

The invention also applies to directed listening to an interpretation. For example, an audience can listen to an audio track corresponding to an interpretation of a score via an audio system having loudspeakers and can view the active zone in the course of play on the score associated with the audio track.

According to one embodiment, the method comprises a step of normalizing said chromatic vector with said theoretical chromatic vectors of said musical score. This normalization step makes it possible to adapt the theoretical chromatic vectors with the estimated chromatic vector and thus improves performance in recognizing and associating the chords played by the performer.

According to one embodiment, the step of comparing said chromatic vector with theoretical chromatic vectors of said musical score comprises the following sub-steps: estimation of the Euclidean distance between said chromatic vector and each theoretical chromatic vector, normalization of the sum of the Euclidean distances obtained, and estimation of a probability of membership of said chromatic vector in each theoretical chromatic vector. This embodiment offers a good compromise between the comparison performance and the necessary computational resources able to allow real-time processing.

According to one embodiment, the step of comparing a transition between said chromatic vector and a previous chromatic vector is performed by means of a Poisson law. This embodiment also offers a good compromise between the comparison performance and the necessary computational resources able to allow real-time processing.

According to one embodiment, at least one estimation is performed on a logarithmic scale. The present invention involves numerous multiplications, often involving values close to 0. Thus, the computations may possibly become unstable because the precision relating to the floating-point numbers in the architecture considered may be exceeded. In order to remedy this, this embodiment makes it possible to perform all the computations in the "log-probabilities" domain; thus all the multiplications become additions and the precision of the computations remains acceptable.

According to one embodiment, the estimation of the duration of the recording step is performed by means of a Viterbi decoding algorithm. This embodiment also offers a good compromise between performance and the necessary computational resources able to allow real-time processing.

According to one embodiment, at least one estimation comprises a threshold below which the estimation is judged irrelevant and the result of which will not be utilized. On account of its probabilistic nature, the score following method according to the invention can be mistaken and give a poor indication to the performer. This can happen when a performer makes a few errors in their performance or else during too free an interpretation of the score. In order to best manage the cases where the information proposed by the method of the invention is not reliable, this embodiment makes it possible to put in place an evaluation criterion judging the relevance of the estimation.

According to a second aspect, the invention relates to a method for modeling a musical score comprising the following steps: slicing of the musical score into at least one series of theoretical chords having a content and a duration, representation of the content of each theoretical chord in the form of a theoretical chromatic vector, and modeling of the theoretical transitions between the various theoretical chords. This second aspect of the invention makes it possible to obtain a representation of the digital score. The chromatic vector is a more "structured" representation of the digital score which makes comparisons between chords simpler.

According to one embodiment, the step of modeling the theoretical transitions between the various theoretical chords is performed by means of a hidden Markov model. This embodiment also offers a good compromise between the comparison performance and the necessary computational resources able to allow real-time processing.

According to one embodiment, said theoretical chromatic vector consists of at least one range of 12 scalars of value 0 or 1, each scalar being associated with one of the half-tones of the chromatic range: do, do#, re, re#, mi, fa, fa#, sol, sol#, la, la#, ti. As a variant, the chromatic vector comprises more scalar numbers, for example so as to integrate the quarter tones of Arabic music.

BRIEF DESCRIPTION OF THE DRAWINGS

The invention will be understood better with the aid of the description, given hereinafter purely by way of explanation, of the embodiments of the invention, with reference to the figures in which.

DETAILED DESCRIPTION OF THE EMBODIMENTS OF THE INVENTION

Figure 1:
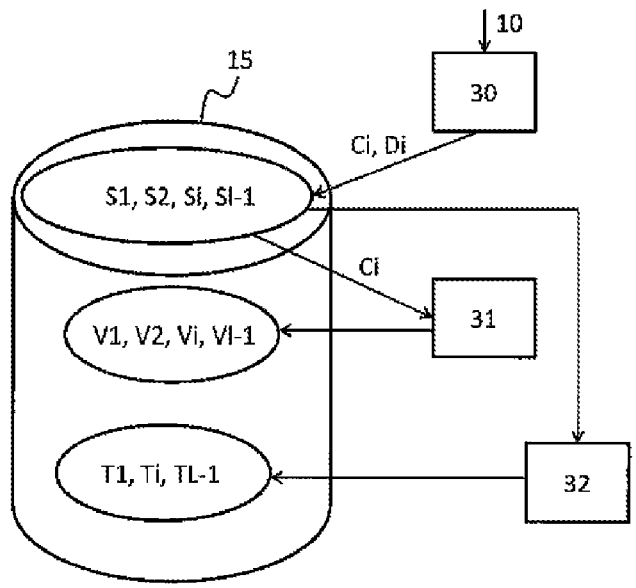
FIG. 1 illustrates the steps of a method for modeling a musical score according to an embodiment of the invention.

FIG. 1 illustrates the steps of a method for modeling a musical score 10 in which the musical score 10 is sliced, in a step 30, into a series of theoretical chords S={S0, S1, ..., Si, SI-1}. Each theoretical chord of S is associated with a content Ci, a, possibly null, set of pitches, and with a duration Di possessing a beginning and an end. The beginning and the end of the chord are respectively the minimum and maximum temporal values before the content Ci of the chord changes.

The content Ci of each theoretical chord Si is represented, in a step 31, in the form of a chromatic vector Vi. Preferably, a chromatic vector Vi consists of a range of twelve scalars whose value lies between 0 and 1, each scalar being associated with one of the half-tones of the chromatic range: do, do#, re, re#, mi, fa, fa#, sol, sol#, la, la#, ti. Preferably, the norm of each chromatic vector Vi is equal to 1. The differences of octaves dissolve inside this representation as a chromatic vector Vi; the absolute pitch of the chord is therefore no longer taken into account. The chromatic vector Vi makes it possible to obtain a compact version of the harmonic content Ci of a theoretical chord Si. The chromatic vector Vi is also a more "structured" representation which makes comparisons between theoretical chords of S simpler and also enables intensive use to be made of the Euclidean distance.

The theoretical transitions T0, Ti, TI-1 between the theoretical chords of S of the digital score 10 are also preferably modeled by means of a hidden Markov model with explicit duration. Accordingly, each theoretical chord Si is considered to be a Markov state and each state Si is associated with a discrete timeline whose expression is as follows:

$$L_i = [L_{i,0} L_{i,1} \ldots L_{i,j} \ldots L_{i,J-1}],$$

with J, the size of a chromatic vector, L and P, the period of sampling of the timelines and Li,j, the probability that the performer has been in the state Si for jP milliseconds. Once this timeline has been constructed, the modalities according to which the performer passes from one chord to another can be modeled.

A database 15 is thus filled in with, for each theoretical chord of S, the chromatic vector Vi and the theoretical transition T0, Ti, TI-1 between the present theoretical chord and the chords of S.

Figure 2:
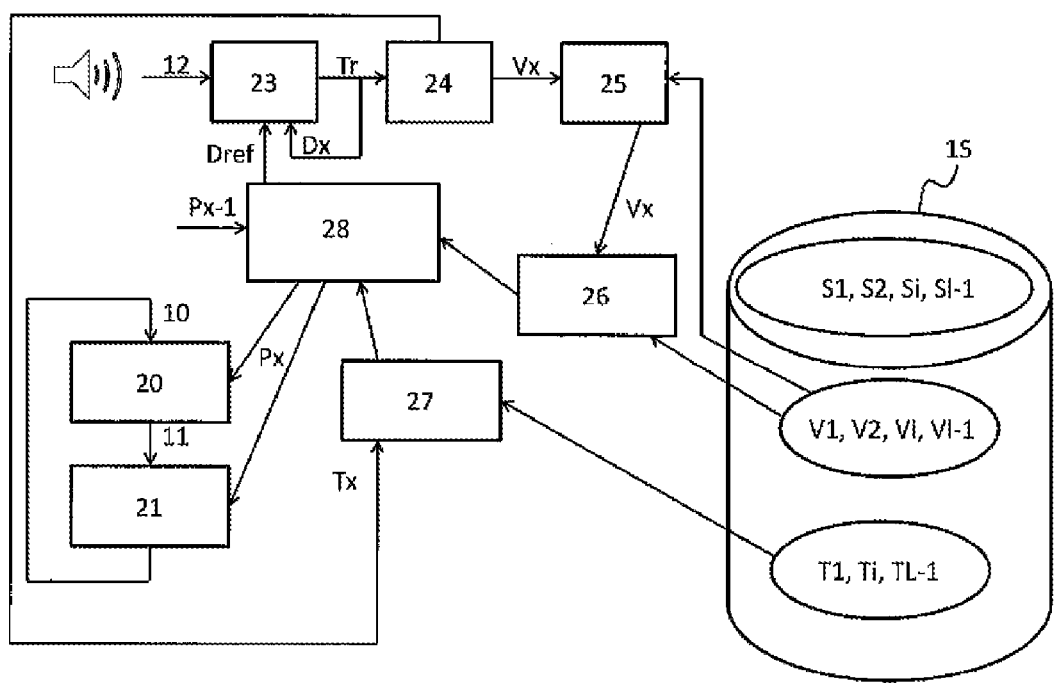
FIG. 2 illustrates the steps of a method for following a musical score according to an embodiment of the invention.

FIG. 2 illustrates the steps of a method for following a musical score 10 and for analyzing the performance of the performer in real time, that is to say within a determined time.

In a first step 23, a sound 12 emitted by the performer is recorded in the form of a data frame Tr of a duration Dx, for example 200 ms. On the basis of the content Cx of this data frame Tr, step 24 consists in estimating a chromatic vector Vx. For example, this estimation can be carried out by a neural network able to recognize all the possible chords played by a performer. A normalization of the chromatic vector Vx is performed thereafter, in a step 25, to correspond to the format of the chromatic vectors V0, V1, ... Vi, ... VI-1 stored in the database 15.

A step 26 consists thereafter in comparing the chromatic vector Vx with the chromatic vectors V0,V1, . . . Vi, . . . VI−1 of the musical score 10. For this purpose, the Euclidean distance Ei is computed between the chromatic vector Vx and each chromatic vector Vi. These values are saved and then normalized so that the sum of the Euclidean distances Ei is equal to 1. The Euclidean distances Ei then represent the "non-membership" of the current frame Tr in the various theoretical chords of S. A last step consists in transforming these probabilities of "non-membership" into a probability "of membership", that is to say by performing the following operation:

$$E_i = 1 - E_i.$$

Another step 27 consists in analyzing the transitions Tx between the chromatic vector Vx and the chromatic vector Vx−1 previously played by the performer. Accordingly, the hidden Markov model with explicit duration is used as a function of the theoretical transitions T0, . . . , Ti, TI−1 stored in the database 15. The computation of the transitions is performed as a function of the following equation:

$$L_{i,0} := \max_j(\text{Poisson}(j,\lambda_i) L_{i-1,j}),$$

in which the term λ represents the expectation associated with each element j of the discrete timeline. The term Poisson refers to a discrete probability law which describes the behavior of the number of theoretical chords of S occurring in the musical score 10.

The probability of emission of the discrete timeline is computed thereafter for all the values of i and j according to the equation:

$$L_{i,j}' = L_{i,j} E_i.$$

These values are saved and then normalized so that the sum of the discrete timelines Li,j is equal to 1. The maximum arguments for i and j indicate respectively the chord most probably played by the performer and the performer's progress within the chord.

The above computations involve numerous multiplications, often involving values close to 0. Thus, the computations may possibly become unstable because the precision relating to the floating-point numbers in the architecture considered may be exceeded. In order to remedy this, all the computations can be performed in the "log-probabilities" domain; thus all the multiplications become additions and the precision of the computations remains acceptable. The above-stated formulae are modified thereby. The computation of the transitions is hence performed according to the following equation:

$$L_{i,0} := \max_j(\log(\text{Poisson}(j,\lambda_i)) + L_{i-1,j}),$$

and the emission probabilities are taken into account according to the following equation:

$$L_{i,j} = L_{i,j} + \log(E_i).$$

The normalization is replaced with a rebasing of the discrete timelines according to the equation:

$$L_{i,j} = L_{i,1} - \max_{n,m}(L_{n,m}).$$

The log-probabilities are thus compensated so that their maximum value is equal to 0.

All this information makes it possible to estimate, in a step 28, a practice position Px of the performer as a function of a previous practice position Px−1, of the comparison of the chromatic vector Vx and of the comparison of the transition Tx. This practice position Px makes it possible to display, in a step 20, and to displace, in a step 21, a marking element 11 on the digital score 10.

Figure 3:
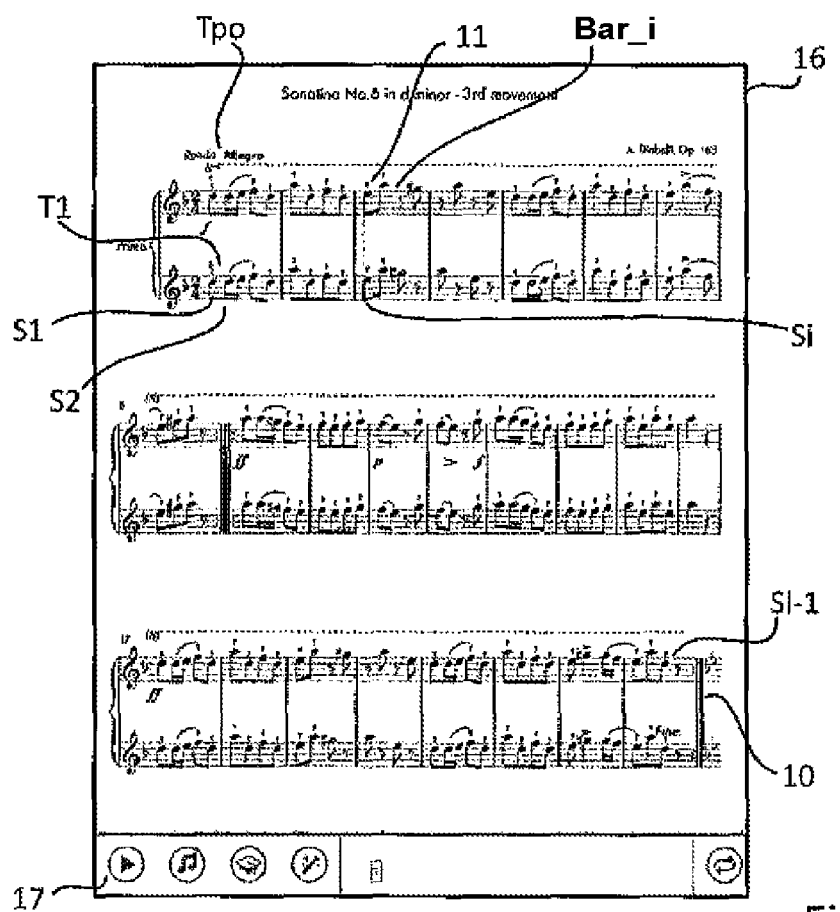
FIG. 3 illustrates an interface for following a musical score according to an embodiment of the invention.

FIG. 3 represents an interface 16 for following a musical score 10 comprising a marking element 11. The marking element 11 takes the form of a discrete line representing the theoretical chord S1, S2, Si, SI−1. Preferably, the bar Bar_i in which the theoretical chord S1, S2, Si, SI−1 is situated is also displayed highlighted. The interface 16 for following the musical score 10 also comprises a command control 17 accessible to the performer in order to adjust settings in the method of the invention for example so as to choose the voice which is interpreted by the performer and the voice or voices which is/are played by the interface.

In this embodiment, when the performer reaches the bottom of a page, the page changes automatically without the performer needing to use their finger. As a variant, the musical score 10 could scroll on the screen as a function of the practice position Px, for example because of the size of the screens of digital tablets.

Furthermore, the durations Di relating to the theoretical chords S1, S2, Si, SI−1 are estimated as a function of the original tempo Tpo of the musical score 10 and the performer does not necessarily conform thereto. The performer may have a desire to interpret, to speed up or to slow down certain parts. The invention implements enhanced following that does not comprise any inappropriate presumption relating to the performer's speed of interpretation. Modeling the tempo V makes it possible to obtain an estimation of the performer's current tempo Tpo_perf. This estimation may turn out to be very useful for advanced synchronization applications. The tempo Di can vary significantly within a musical score 10; for this reason the performer's precise tempo Tpo_perf is not considered and the tempo V is estimated as a function of the following equation:

$$V = \frac{\text{Tpo\_perf}}{\text{Tpo}}.$$

This estimation of the tempo V gives a relative playing speed of the performer with respect to the musical score 10. In order to give an estimation of this speed, it is possible to use one of the algorithms applicable to Markov chains, Viterbi decoding. This is a dynamic programming technique making it possible to trace the most probable succession of states that has led to a target state. In the case of a Markov chain with explicit duration, the target is not exactly a state, but a temporal offset jP within a state Si of probability Li,j. Specifically, each target has a vector Mi,j of size K storing its history. The vector Mi,j is updated during the transition step according to the equation:

$$M_{i,j} = \begin{cases} M_{i,j-1}, & \text{if } j > 0 \\ \text{shift}(M_{i-1,j_{max}^{i-1}}), & \text{otherwise} \end{cases},$$

with $j_{max}^i = \arg\max_j L_i$ and shift($M_{i,j}$) the operation assigning $$m_{i,j,k} = \begin{cases} m_{i,j,k-1}, & \text{if } k > 0 \\ j, & \text{if } k = 0 \end{cases},$$

for all k.

The vector $M_{i,j}$ summarizes the time spent in the last K states thus making it possible to obtain the estimation of the tempo for a given target according to the equation:

$$\tilde{V}_{i,j} = \frac{\sum_{k=1}^{K} D_{i-k}}{\sum_{k=1}^{K} m_{i,j,k}}.$$

The final tempo is obtained by evaluating $\tilde{V}_{i,j}$ on the basis of the most probable target, indexed by $(i,j)=\arg\max_{i,j} L_{i,j}$. Once the tempo estimation has been computed, the durations Di associated with the theoretical chords Si are modified. This alteration of the durations Di allows a more suitable processing of the next audio frame Tr played by the performer.

On account of its probabilistic nature, the method for following the musical score 10 can be mistaken and give a poor indication to the performer. This can happen when the performer makes a few errors in their performance or else during too free an interpretation of the musical score 10. In order to best manage the cases where the information proposed by the method is not reliable (for example by warning the performer), it may be beneficial to put in place an evaluation criterion judging the relevance of the estimators for example by using the "rebasing" step detailed previously. During this procedure, the term maxn,m(Ln,m) may be interpreted as a global penalty, induced by the last frame Tr considered. By averaging maxn,m(Ln,m) over the last N frames, it is possible to obtain a penalty relating to the last NP milliseconds of play. Hence, it is possible to fix a threshold above which the estimation is judged reliable.

As regards the following of the musical score 10, in a first approximation, it may be considered that the performer can reach the state Si only from the state Si−1, the previous theoretical chord of the musical score 10. Stated otherwise, the performer plays all the chords. In actual fact, the performer rarely has this discipline; on the contrary, they may wish to train themselves and move to and fro within the piece that they are practicing, stop and then resume somewhere else. In order to address this presumption, the method of the invention makes it possible to perform "jumps" within the musical score 10, breaking the continuity induced by the choice of the transition probabilities. In the "log-probabilities" space, a value of 0 corresponds to a probability of 1 and a value of −1 corresponds to a probability of 0 (a strict impossibility). The method associates "log-probabilities" less than 0 or even equal to −1 with certain zones of the musical score 10. Such values, established on the basis of the history of the performance of the performer, hinder almost definitively the possibility of the algorithm considering the zone in question to be the start point of a new performance segment, even if the subsequently analyzed frames so suggest.

In order to remedy this, it is possible to chart the probabilities Li,j that have become too small. In actual fact, this is manifested by the thresholding operation carried out according to the following equation:

$$L_{i,j} = \begin{cases} L_{i,j}, & \text{if } L_{i,j} \geq Z \\ Z, & \text{otherwise} \end{cases},$$

with Z the desired threshold. The threshold in question should be chosen judiciously; it should not be too high, the effect of which would be to render each zone of the score equiprobable in any circumstance, nor too low, so as to remain effective. Thus, discontinuities of play are permitted within the model and, when such a discontinuity arises, the method takes only a few seconds to converge to the new position Px.

The invention thus makes it possible to efficiently guide a performer according to their interpretation of a digital score 10 by taking into account their tempo and their changes of reading line.

The invention claimed is:

1. A method for following a musical score, comprising the steps of:
   displaying of a marking element on the musical score;
   displacing the marking element;
   performing the following steps in real-time:
      recording at least one sound emitted by a performer in a form of a data frame of a duration;
      estimating at least one chromatic vector based on a content of the data frame;
      comparing said at least one chromatic vector with theoretical chromatic vectors of the musical score;
      comparing a transition between said at least one chromatic vector and a previous chromatic vector with theoretical transitions of the musical score; and
      estimating a practice position of the performer as a function of a previous practice position, the comparison of said at least one chromatic vector and the comparison of the transition;
   wherein the steps of displaying and displacing the marking element are performed as a function of the practice position of the performer, and
   wherein the step of recording is performed over the duration established as a function of a ratio between a duration of the transition and a reference duration.

2. The method as claimed in claim 1, further comprising a step of normalizing said at least one chromatic vector with the theoretical chromatic vectors of the musical score.

3. The method as claimed in claim 2, wherein the step of comparing said at least one chromatic vector with the theoretical chromatic vectors of the musical score further comprises sub-steps of:
   estimating an Euclidean distance between said at least one chromatic vector and each theoretical chromatic vector;
   normalizing a sum of the Euclidean distances obtained; and
   estimating a probability of a membership of said at least one chromatic vector in said each theoretical chromatic vector.

4. The method as claimed in claim 1, wherein the step of comparing said at least one chromatic vector with the theoretical chromatic vectors of the musical score further comprises sub-steps of:
   estimating an Euclidean distance between said at least one chromatic vector and each theoretical chromatic vector;
   normalizing a sum of the Euclidean distances obtained; and
   estimating a probability of a membership of said at least one chromatic vector in said each theoretical chromatic vector.

5. The method as claimed in claim 1, wherein the step of comparing the transition between said at least one chromatic vector and the previous chromatic vector utilizes a Poisson law to perform the comparison.

6. The method as claimed in claim 1, wherein at least one of the estimating steps is performed on a logarithmic scale.

7. The method as claimed in claim 1, wherein the duration of the recording is estimated utilizing a Viterbi decoding algorithm.

8. The method as claimed in claim 1, further comprising steps of comparing at least one estimation to a threshold, and discarding said at least one estimation in response to a determination that it is below the threshold.

* * * * *